Fig. 3.
INDICATOR DIAGRAM
COLD END

Fig. 4.

Fig. 5.
INDICATOR DIAGRAM
COLD END

United States Patent Office
3,368,360
Patented Feb. 13, 1968

3,368,360
CRYOGENIC APPARATUS
Edgar Frank Daly and Thomas James Dean, Cambridge, England, assignors to Unicam Instruments Limited, Cambridge, England, a British company
Filed Dec. 21, 1966, Ser. No. 603,666
Claims priority, application Great Britain, Dec. 22, 1965, 54,274/65
20 Claims. (Cl. 62—6)

ABSTRACT OF THE DISCLOSURE

Cryogenic apparatus is described having a two-stage heat pump operating with helium to effect cooling below the Joule-Thomson inversion temperature. Compressed helium cooled by the heat pump is liquefied in a Joule-Thomson expansion stage. The heat pump uses a sealed diaphragm hydraulically driven compressor and a rolling diaphragm, hydraulically-operated piston displacer to give a sealed gas system minimizing contamination, the compressor and displacer operating with a regenerator on a modified Kirk cycle.

This invention relates to cryogenic apparatus for producing low temperatures and has for its principal object to provide a simple and reliable form of heat pump in which a working gas is taken through an appropriate thermodynamic cycle accepting heat at a low temperature and rejecting it at a higher temperature. Such a heat pump, utilising helium as a working gas, may be used to obtain temperatures below the Joule-Thomson inversion temperature of helium and can be employed with a final helium Joule-Thomson expansion system to give extremely low temperatures—below 20° K. and possibly much lower than this.

Various cyclic methods are known and used for refrigerating systems. In general, the gas is cyclically compressed and expanded by the action of a sliding seal compressor or the quantity of gas contained within the system is changed between each cycle.

According to this invention, in cryogenic apparatus comprising a heat pump making use of the cyclic compression and expansion of a gas through a regenerator, the compression and expansion are effected by a hydraulically driven free diaphragm compressor and a sealed piston displacer. By using a substantially sealed gas system with hydraulic operation, undesired impurities in the gas are kept to a minimum. The gas typically is helium and, by using a cascade system, conveniently a two-stage heat pump, it is possible to obtain temperatures below the Joule-Thomson inversion temperature. Such a system may therefore be used in conjunction with a Joule-Thomson expansion stage employing compressed helium to produce temperatures in the range 3.5° K. to 5° K. The avoidance of any contamination is particularly important in achieving reliable operation at such low temperatures, particularly in small scale refrigerators, because contamination may lead to blockages and also because of abrasion caused by solidified impurities.

Preferably the compressor and displacer, or each compressor and displacer in a two stage heat pump, are operated in a Kirk cycle or a modified Kirk cycle; the gas is, in such a cycle, expanded back through the regenerator so that the external work done on and by the gas may all be effected at the hot end of the system. It is possible, as described below, to eliminate any need for valves or seals in the low temperature part of the apparatus, thereby further increasing the reliability which can be achieved.

In one construction, the hot end of the regenerator is in heat exchange relationship with that end (the "hot" end) of the displacer towards which the piston travels when the gas is drawn into the displacer and the cold end of the regenerator is in heat exchange relationship with the other end of the displacer. In a two-stage heat pump, each stage having a hydraulically driven free diaphragm compressor, a sealed piston displacer, and a regenerator, the cold ends of the first stage displacer and regenerator may be arranged in heat exchange relationship with an intermediate point in the second stage regenerator. Conveniently in such a construction the second stage displacer has a longer cylinder than the first stage displacer and the end (the hot end) of the second stage displacer towards which the piston travels when the gas is drawn into this displacer may be in heat exchange relationship with the hot ends of both regenerators. Water cooling may be provided for a plate acting as a heat exchanger for the hot ends of the two displacers and two regenerators; these hot ends may thus readily be kept at room temperature.

In the following description, reference will be made to the accompanying drawings in which.

Figure 1:
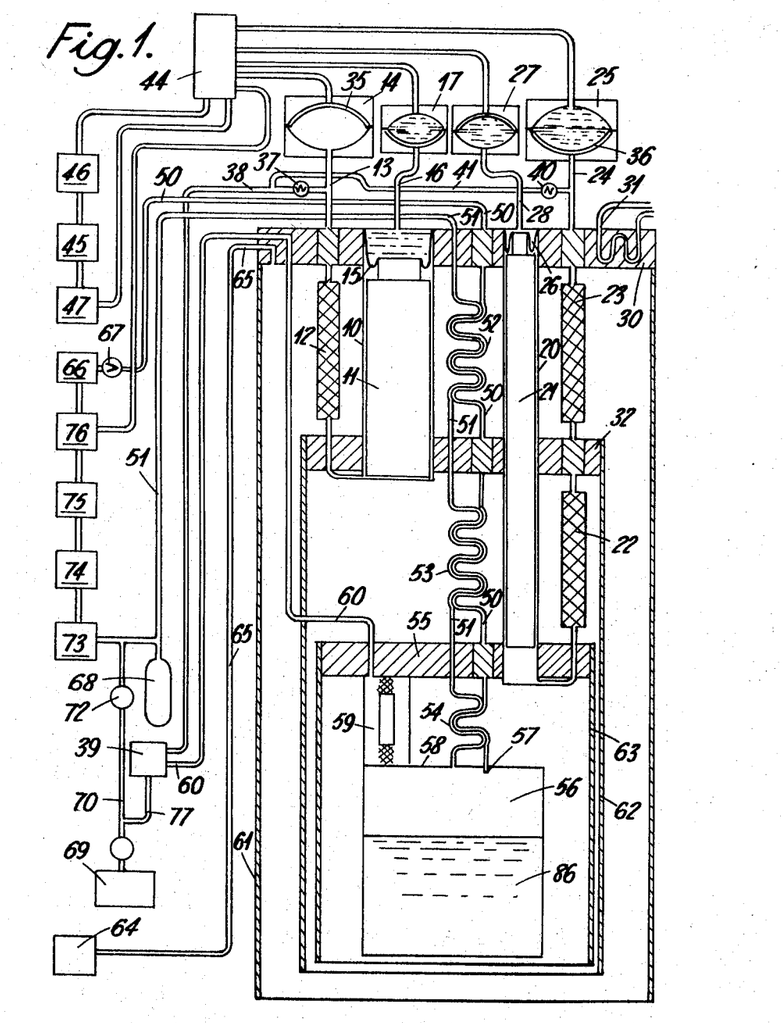
FIGURE 1 is a diagram of one form of cryogenic apparatus constructed in accordance with the present invention.

The refrigeration apparatus shown in FIGURE 1 is for the production of liquid helium. It consists basically of two heat pump stages operating in cascade to provide cooling for a Joule-Thomson expansion stage.

The first stage comprises a cylinder 10 containing a long gas displacer piston 11. The lower end of the cylinder 10 is connected to a regenerator 12, which, in turn, is connected by a tube 13 to a hydraulically driven free diaphragm compressor 14. The gas displacer piston 11 is supported at its upper end by a rolling diaphragm seal 15 connected to the wall of the cylinder 10 to isolate the piston 11 from hydraulic driving fluid driving the piston 11 through a tube 16 from a hydraulic displacer 17. The regenerator 12 is essentially a tube having a low thermal conductance and containing a matrix of high thermal capacity. The regenerator matrix has as small as possible internal space for gas. The matrix may be made of copper or copper alloy gauze or shot. The matrix provides a large number of internal gas channels so that the maximum thermal contact is maintained between helium gas in the system and the matrix whilst maintaining a minimum resistance to gas flow and minimum heat conduction in the matrix in the direction of gas flow.

The second heat pump stage is similar to the first stage. However the second stage displacer cylinder 20 and piston 21 are longer than the first stage cylinder 10 and piston 11. The lower end of the cylinder 20 is connected through a lower regenerator 22, an upper regenerator 23 and a tube 24 to a hydraulically driven compressor 25. The upper regenerator 23 is similar to the regenerator 12. However, the lower regenerator 22, whilst of generally similar construction to the regenerator 12, preferably contains lead shot. The gas displacer piston 21, has at its upper end a rolling diaphagm seal 26 similar to that from piston 11, to isolate the piston 21 from hydraulic fluid which drives it from a hydraulic displacer 27 through a tube 28.

The upper ends of regenerators 12 and 23 and cylinders 10 and 20 are connected in heat exchange relationship by a plate 30 acting as a heat exchanger. This plate contains passages 31 through which water is passed to maintain the plate 30 at room temperature. The lower ends of the cylinder 10 and regenerator 12 and the intermediate point between the upper and lower regenerators 22, 23 are also in heat exchange relationship by a further heat exchanger 32.

The diaphragm compressors 14 and 25 are hollowed bodies containing flexible diaphragms 35, 36, respectively, made of nylon reinforced nitrile rubber or polyethylene, the diaphragm separating the hydraulic driving fluid from the helium gas in the system. The hydraulic displacers 17 and 27 are similar in construction to the compressors 14 and 25 but serve to displace hydraulic fluid instead of compressing helium gas.

The aforementioned tube 13 has a T piece which is connected through a restrictor 37 and tube 38 to a sub-system gas store 39. Similarly tube 24 is connected through a T piece, restrictor 40 and tube 41 to tube 38 and thus to the same gas store 39.

The compressors 14, 25 and hydraulic displacers 17, 27 are hydraulically driven and controlled in their cycle of operation by a rotary distributor valve 44 which feeds high pressure hydraulic fluid from a pump 45 and high pressure reservoir 46 to the appropriate compressors or hydraulic displacers during appropriate periods, the fluid being exhausted from the compressors or hydraulic displacers through the distributor valve 44 to a low pressure reservoir 47 which feeds the pump 45.

The Joule-Thomson expansion stage comprises two tubes 50, 51 carrying the helium to be liquefied. The tubes 50, 51 are in close physical relationship at 52, 53 and 54 where they act as heat exchangers. They are also in heat exchange relationship with the heat exchangers 30 and 32 and with a heat exchanger 55 at the lower end of the second stage cylinder 20 and regenerator 22. Both of the tubes 50, 51 after passing through the heat exchanger 55, are connected to a storage vessel 56, the entry of the tube 50 to the storage vessel being in the form of a fine nozzle 57 constituting an expansion valve. The lid 58 of the storage vessel 56 is thermally linked with the heat exchanger 55 by a convection cooling loop 59 supplied with helium gas from the aforementioned store 39 via a tube 60. The tube 60 includes a valve (not shown) to isolate the convection loop 59 when the container 58 is below the inversion temperature. The three heat exchangers 30, 32 and 55 are connected respectively to a vacuum casing 61 and separate heat shields 62 and 63 which form successive shields around the vessel 56. The volumes within the heat shields are evacuated to a pressure of the order of $10^{-5}$ millimetres of mercury by means of a diffusion vacuum pump 64 which is coupled through the heat exchanger plate 30 by means of a tube 65.

Helium gas for the Joule-Thomson expansion stage is supplied from a high pressure store 66 through a reducing valve 67 in the tube 50. Connected to the tube 51 is an expansible helium store 68. The store 68 is to compensate for changes in pressure of the gas in the Joule-Thomson system on cooling, liquefication and return to room temperature. If the pressure in this system falls below a predetermined level on cooling, gas from a main store 69 is admitted through a tube 70 via feed valves 71, 72. The high pressure store 66 derives its helium from a low pressure store 73 which is at atmospheric pressure and feeds a first stage mechanically driven diaphragm compressor 74 which compresses the helium to a pressure of 4 atmospheres and which charges a store 75 to this pressure. This store supplies helium to a hydraulically driven diaphragm compressor 76. The operation of compressor 76 is controlled by the distributor valve 44 and this compressor 76 raises the pressure of the helium to 30 atmospheres to charge the high pressure store 66. The reducing valve 67 which supplies the Joule-Thomson stage reduces the pressure of the helium to 18 atmospheres.

As previously described, the helium gas for the two heat pumps is supplied via pipes 38 and 41, and the associated restrictors 37 and 40 respectively, from the helium store 39. This store is connected through a tube 77 and the feed valve 71 to the main helium store 69.

Figure 2:
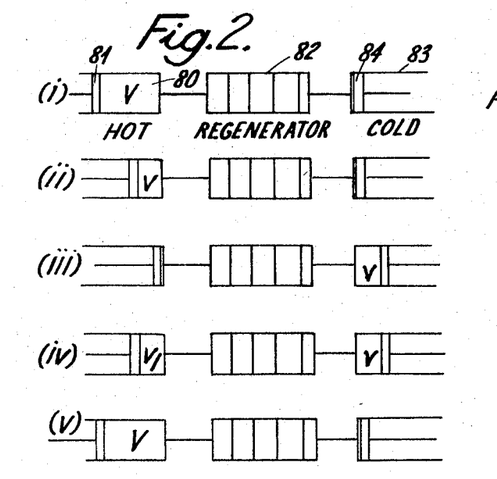
FIGURES 2 and 3 are diagrams explaining the Kirk cycle.
Figure 3:
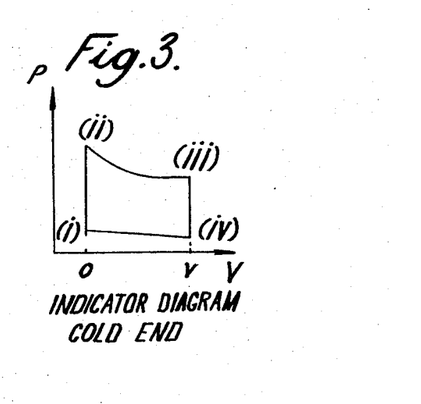

Before describing the operation of the apparatus of FIGURE 1, it is convenient to explain the modified Kirk cycle used for the two stage heat pump. FIGURE 2 is a diagram illustrating the Kirk cycle and FIGURE 3 is an indicator diagram for the cold end piston of this cycle. Referring to FIGURE 2, the heat pump is illustrated diagrammatically as a hot end cylinder 80 with piston 81, a regenerator 82 and a cold end cylinder 83 with a displacer piston 84. In FIGURE 2(a) there is a volume V of gas in the cylinder 80 and zero volume in the cylinder 83. This corresponds to position (i) on the indicator diagram of FIGURE 3. As shown in FIGURE 2(b), the volume V in cylinder 80 is reduced to v by piston 81, the volume of cylinder 83 remaining zero thus is represented by (ii) on the indicator diagram. The volume v in cylinder 80 is now reduced to zero by piston 81 and piston 84 is withdrawn in cylinder 83 to an identical volume $v_1$ the gas thus passing through the regenerator 82 as shown in FIGURE 2(c). This gives position (iii) on the indicator diagram. The piston 81 is now withdrawn as shown in FIGURE 2(d) to give a volume $v_1$ in cylinder 80 such that $v_1+v=V$. This gives position (iv) on the indicator diagram. The piston 81 is now withdrawn to volume V and piston 84 drives in to zero volume in cylinder 83 as shown in FIGURE 2(e) to bring the conditions at the cold end back to position (i) on the indicator diagram. This is a reversible cycle and the amount of cooling obtainable is indicated by the area enclosed by the cold end indicator diagram.

Figure 4:
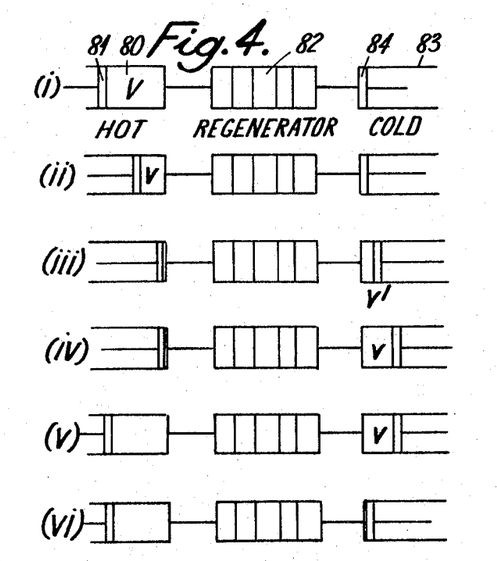
FIGURES 4 and 5 are diagrams explaining a modified Kirk cycle used in the apparatus of FIGURE 1.
Figure 5:
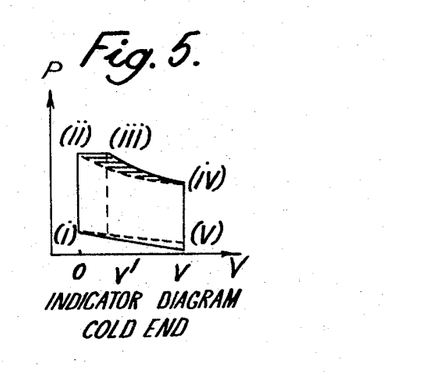

In the apparatus of the present invention, it is preferred to use a modified Kirk cycle illustrated in FIGURES 4 and 5. FIGURE 4 illustrates the apparatus in the same way as FIGURE 2 whilst FIGURE 5 shows the resultant cold end indicator diagram. Increased cooling, shown by the shaded area in FIGURE 5, is obtained by this modified cycle. In this cycle, FIGURE 4(a) shows a volume V in cylinder 80 and zero volume in cylinder 83, the cold end conditions being shown at (i) on the indicator diagram of FIGURE 5. As shown in FIGURE 4(b) the volume V in cylinder 80 is reduced to v whilst still keeping zero volume in cylinder 83 to give condition (ii) in FIGURE 5. Next, as shown in FIGURE 4(c), volume v in cylinder 80 is reduced to zero whilst piston 84 is withdrawn in cylinder 83 to establish a volume $v^1$. This is illustrated at (iii) in the indicator diagram. Then, as shown in FIGURE 4(d) the volume in cylinder 80 remains at zero whilst the volume in cylinder 83 is expanded to v by withdrawing piston 84 so giving position (iv) on the indicator diagram. As shown in FIGURE 4(e), the volume V is then re-established in cylinder 80 by withdrawal of piston 81 whilst the volume v remains unchanged in cylinder 83. This is shown at (v) in the indicator diagram. Lastly, as shown in FIGURE 4(f) the initial conditions are restored by leaving the volume V unchanged in cylinder 80 whilst driving the piston 84 into cylinder 83 to reduce the volume in that cylinder to zero.

Referring to the first stage heat pump of FIGURE 1, it will be seen that the cylinder 80 and piston 81 correspond to the cavity of compressor 14 and its diaphragm 35; the regenerator 82 corresponds to regenerator 12; and the cylinder 83 and piston 84 correspond to the cylinder 10 and piston 11. There is a similar equivalence to the second stage.

Reverting now to FIGURE 1, the operation of the apparatus is as follows: Initially the heat pump stages are evacuated and then charged with helium from the store 39 which, in turn is charged from the main store 69 via the feed valve 71 which is set to operate at about 16 atmospheres pressure. The gas displacer 11 will initially be forced into its lowest position as shown, being driven there by hydraulic fluid admitted to the hydraulic displacer 17 by distributor valve 44, the diaphragm 35 of compressor 14 being in its raised position such that there is a large volume of helium at the upper end of the regenerator 12. Hydraulic fluid is then passed by the distributor valve 44 at a pressure of approximately 30 atmospheres to the upper side of diaphragm 35 to distort it and compress the helium in the heat pump also to a pressure of 30 atmospheres. The hydraulic pressure which had previously been applied to the hydraulic displacer 17 from the distributor valve 44 is relieved and the difference in pressure between the gas in the heat pump and the hydraulic fluid above the diaphragm 15 is such as to cause the gas displacer 11 to rise and thereby increase the volume at the bottom of the cylinder 10. Helium is therefore transferred through the regenerator 12 to the lower end of the cylinder 10 and the diaphragm 35 of the compressor 14 will move further downwards to maintain the pressure of the helium at 30 atmospheres. The pressure exerted by the hydraulic fluid on diaphragm 35 is then gradually relieved and the diaphragm will move upwards increasing the volume of the gas and reducing the pressure so causing helium to flow back through the regenerator 12. Finally the hydraulic pressure in the hydraulic displacer 17 is increased to cause the gas displacer 11 to move once again to its lower position to force the remaining helium through the regenerator 12. This sequence of operations gives the modified Kirk cycle described above with reference to FIGURES 4 and 5. It is repeated cyclically and leads to the cooling of the lower end of the cylinder 10. There is therefore created a temperature gradient along the regenerator 12. Hot gas entering at the top of the regenerator 12 is cooled by contact with the matrix contained within the regenerator and enters the lower end of the cylinder 10 at a lower temperature. Conversely cold gas entering the regenerator 12 from the lower end of the cylinder 10 is warmed by contact with the matrix and enters the compressor 14 at a higher temperature. The second stage heat pump operates in a similar manner to the first stage but the cycle of operation of the second stage lags that of the first stage by half a cycle.

After a time, the two heat pump stages settle down to a condition such that the heat exchanger plate 30 is maintained at or near room temperatures by the cooling water flowing through tube 31 which removes the heat due to compression of the helium. The heat exchanger 32 falls to a temperature in the range of 50° K. to 80° K. by the cooling action of the first stage. This heat exchanger 32 reduces the demand made upon the regenerators 22, 23 and also serves to counteract any thermal inefficiencies of these regenerators. The lower heat exchanger 55 falls to a temperature within the range 12° K. to 15° K. by the cooling action of the second stage heat pump. These two heat pump stages work on a quantity of helium initially introduced into the system and whose pressure is cyclically altered from 5 to 30 atmospheres. The heat pumps are initially charged with helium at a pressure of 5 atmospheres but, as the pumps settle down to their operating temperatures, the gas tends to contract and the pressure is reduced. The operating pressure of the helium gas forming the working fluid of these heat pumps must be maintained during the cooling of these stages. Conversely, on completion of the operating sequence and return to room temperature, the excess gas must be removed from the heat pump system. This is achieved by sensing the mean pressure of the gas in the two heat pump stages over a cycle of operation by means of the restrictors 37, 40 respectively. The time constant of the restrictors is long compared with the cycle period (which is one second in the particular embodiment described), but is less than two minutes in this particular embodiment. Thus, gas transfer per cycle is negligible through the restrictors but the cumulative pressure drop due to cool down is compensated for within the two minute period by gas from the store 39. A similar transfer, in the reverse direction is accomplished when the equipment returns to room temperature. If, after a considerable period of time, gas leakage from heat pump sub-system has occurred, on cooling, pressure in the store 39 may drop below the setting of feed valve 71 which then allows helium from the main store 69 to be fed into the heat pump sub-system.

The Joule-Thomson stage, during the operation of the heat pump stages, has helium at the pressure of 18 atmospheres passed through the tube 50, the helium being cooled as it passes through the heat exchangers 30, 32 and 55. The helium is allowed to expand into the storage vessel 56 as it passes out of the nozzle 57 and will cool provided that the temperature of the helium has fallen below its inversion temperature. This cooled helium is passed back to the low pressure store 73 by the tube 51 and serves to cool the helium entering the Joule-Thomson stage through tube 50 at the interchangers 52, 53 and 54. As the process continues, the temperature of the helium drops even further and, on expansion from the nozzle 57, the helium will liquify to be collected within the storage vessel 56 as indicated at 86. The heat shields 62 and 63 surrounding the vessel 56 are maintained at the temperature of the heat exchangers 32 and 55 to which they are connected and, in conjunction with the evacuation of the region within the vacuum casing 61, the shields form a heat barrier between the vessel 56, which is at the temperature of liquid helium, and the temperature of the atmosphere surrounding the apparatus.

As an alternative form of thermal insulation, a multi-layer insulation consisting of alternate layers of aluminium foil and nylon net may be employed. This insulation is swathed about the apparatus at the two-stages (corresponding to the heat exchangers 32 and 55) with a greater number of layers surrounding the coldest part.

Figure 6:
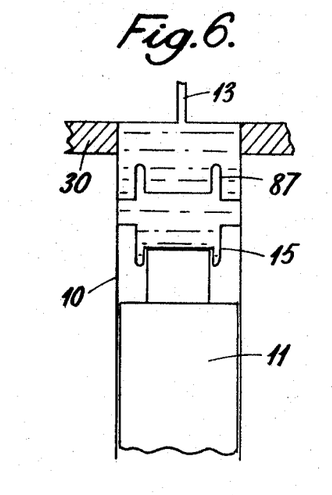
FIGURES 6 and 7 illustrate modifications of a rolling seal used in the apparatus of FIGURE 1.
Figure 7:
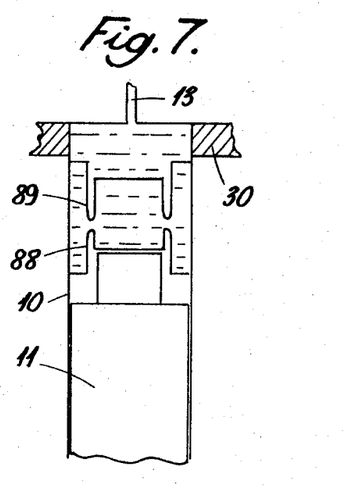

In the apparatus of FIGURE 1, each gas displacer 11 and 21 has been shown suspended by a single rolling diaphragm seal 15 and 26 respectively. The hydraulic fluid which drives the displacers and which is on the upper side of the seals cyclically varies in pressure from atmospheric to about 30 atmospheres. On the underside of each seal, the pressure of the gas reaches that of the fluid during the high pressure period of the cycle but, during the low pressure period of the cycle, only drops to about five atmospheres and is therefore higher than that of the fluid during this period. It has been found that, whilst the rolling diaphragm seals are capable of withstanding extremes of pressure across them when the higher pressure is present on the upper surface, it is possible to experience a break-up of the seal when the higher pressure is present on the reverse side. To avoid this possibility, provision can be made to ensure that the seal from which the displacer is suspended will always have a higher pressure at its upper surface. One arrangement for achieving this is shown in FIGURE 6 where the displacer 11 is shown suspended from a rolling diaphragm seal 15 as in FIGURE 1 but, above this seal 15, there is provided a further rolling diaphragm seal 87 which is inverted with respect to seal 15. The region between the two seals 15 and 87 is filled with hydraulic fluid. An alternative arrangement is shown in FIGURE 7 in which the displacer 11 is suspended from a rolling diaphragm seal 88 which is inverted compared with seal 15 of FIGURES 1 and 6. Above the seal 88 is a further rolling diaphragm seal 89 which is inverted with respect to seal 88. The region between the seals 88 and 89 is filled with hydraulic fluid.

Figure 8:
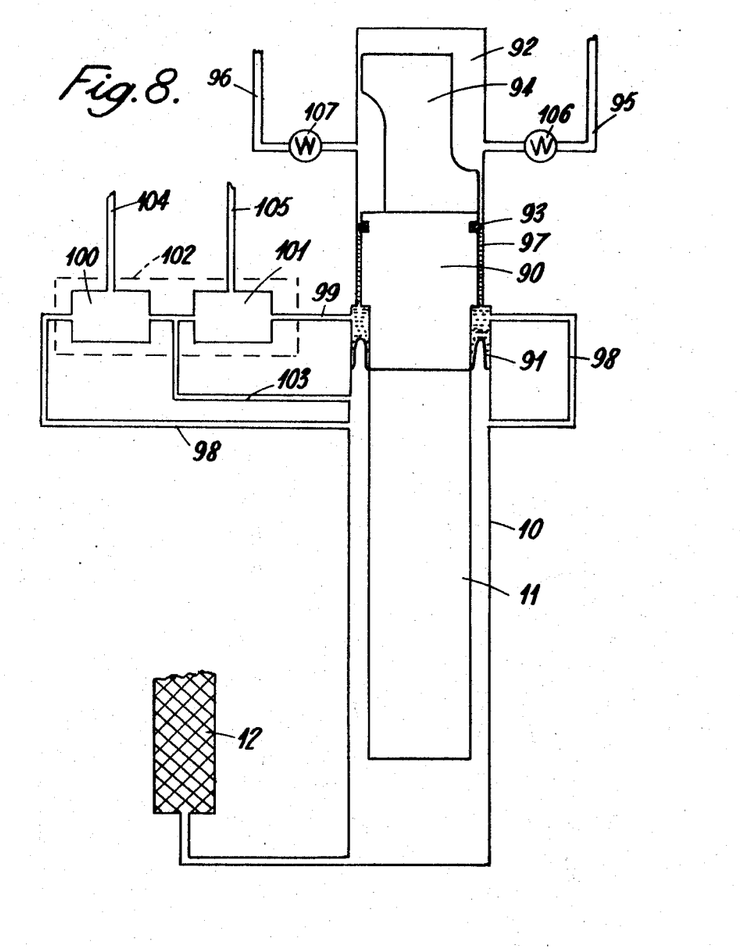
FIGURE 8 illustrates a modification of the displacer driver of the apparatus of FIGURE 1.

FIGURE 8 illustrates a preferred modification of FIGURE 1 which not only ensures always that there is a higher pressure on the desired side of the rolling seal but also eliminates the intermediate sealed hydraulic fluid system between the compressors 17 and 28 and the rolling diaphragm 15 and 26 of FIGURE 1. In FIGURE 8 only the displacer 11 in cylinder 10 is shown; a similar arrangement is used for the displacer piston 21 in cylinder 20. Referring to FIGURE 8, the displacer piston 11 is fixed to a piston 90 with a rolling diaphragm seal 91 between these two pistons extending outwardly to the cylinder 10. The piston 90 moves in a cylinder 92 and has an annular groove in which is fitted an O-ring seal 93. The piston 90 carries a spool valve 94 controlling the admission of fluid to the cylinder 92 from supply pipes 95, 96 connected respectively to low and high pressure ports on the distributor valve 44. Sealed between the O-ring 93 and the rolling diaphragm 91 is a body of hydraulic fluid 97 connected via pipes 98, 99 to control valves 100, 101 which together form the valve assembly 102. A fine tube 103 of low dead volume connects the valve assembly 102 to the cylinder 10. Pipes 104 and 105 connect the control valves 100, 101 to the high and low pressure hydraulic fluid reserves 46 and 47 respectively.

In operation, high pressure hydraulic fluid from the rotary distributor valve 44 is passed to cylinder 92 via pipe 96 to drive the piston 91, and hence displacer 11, downwards. Hydraulic fluid is subsequently exhausted through pipe 95 and rotary valve 44. The pipes 95 and 96 are fitted with restrictors 106, 107 to give partial control of the flow of hydraulic fluid to and from cylinder 92 and further control is achieved by the spool valve 94 which cuts off the flow from the pipe 96 at the end of the downward strokes and closes pipe 95 prior to the commencement of the next downward stroke. The hydraulic fluid 97 is maintained, by means of the control valves 100 and 101, at a pressure some ½ atmosphere below that of cylinder 10, sensed by pipe 103, so as to maintain the inverted U configuration of the rolling diaphragm 91 throughout the displacer stroke. Hydraulic fluid replacement or discharge is effected automatically by valves 100 and 101 from and to the reservoirs 46 and 47 via pipes 104 and 105 respectively.

Figure 9:
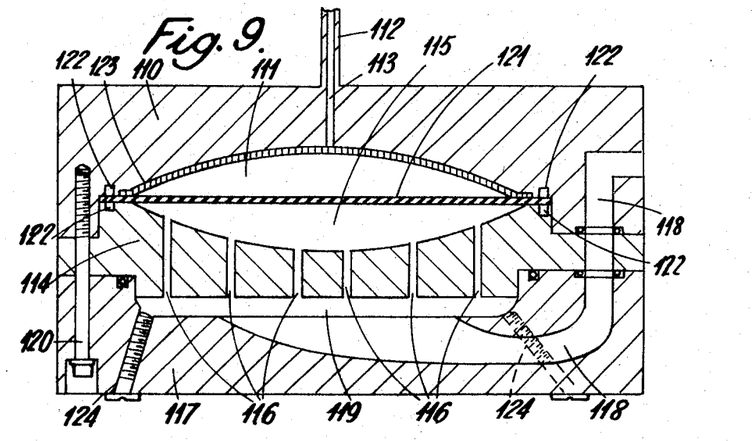
FIGURE 9 is a cross-sectional view of a free-diaphragm helium compressor.

FIGURE 9 illustrates a free diaphragm compressor for compressing helium gas which is used as the compressors 14 and 25 of FIGURE 1. The compressor of FIGURE 9 has an upper plate 110 in which there is a depression 111 of part-spherical shape, the depression being coupled to a tube 112 by a hole 113. To the plate 110 is secured a middle or oil plate 114 having a depression 115 similar in shape to depression 111. Through the plate 110 pass a number of holes 116, the purpose of which will be described later. Secured to the underside of the plate 114 is a lower end plate 117 in which there is formed a bore 118 which co-operates with bores formed in the plates 110 and 114 to constitute a passage leading from the exterior surface of the plate 110 into a circular aperture 119 formed between the oil plate 114 and the lower end plate 117. The assembly is secured together by a number of bolts 120 of which only one is shown in FIGURE 9.

Between the two depressions 111 and 115 is a flexible diaphragm 121 of nitrile rubber or polyethylene, a seal being maintained between the diaphragm 121 and the upper plate 110 and oil plate 114 by means of O-ring seals 122. On the inside of the depression 111 formed in the upper plate 110 is received a gas collector plate 123 made from polypropylene sheet and through which a multiplicity of holes are formed such that the collector plate 123 is porous. On that surface of the collector plate 123 which is secured to the upper plate 110, there is a number of grooves which radiate from the hole 113 to the periphery of the collector plate 123.

In operation, the tube 112 is connected to the helium gas to be pressurised whilst the pipe 118 is connected to the hydraulic fluid distributor valve 44. The hydraulic fluid will pass through the pipe 118 and holes 116 into the depression 115 to apply an even pressure to the underside of the diaphragm 121. When the gas is at a higher pressure (when say it is at 5 atmospheres) than the hydraulic fluid, the diaphragm 121 will be distorted towards the inner surface of the depression 115, but, when the pressure of the hydraulic fluid is raised, say to the order of 30 atmospheres, then the pressure of the fluid on the diaphragm 121 will cause the diaphragm to be forced towards the gas collector plate 123. This gas collector plate allows all the gas in the depression 111 to be compressed into the tube 112, the holes and grooves in the gas collector plate conveying the gas to the hole 113. In the absence of such a collector plate, it would be possible for small pockets of gas to be trapped between the diaphragm 121 and the inner wall of the depression 111.

In order that the fluid portion of the compressor may be bled and filled, the lower end plate 117 is provided with drain holes and plugs 124 through which the fluid may pass when the plugs are removed. The diaphragm compressor of FIGURE 9 is normally mounted with the shorter sides horizontal, i.e., with the diaphragm in a generally upright plane.

The construction of free diaphragm compressor shown in FIGURE 9 permits of easy dismantling should it be necessary to replace the diaphragm 121 or seals 122; it is only necessary to unscrew the bolts 120 and remove the lower plate 117 and oil plate 114 leaving the upper plate 110, which is connected to the gas and hydraulic fluid supplies, in its normal position.

In practice, to obtain the required change in pressure for the volumes of each heat pump stage, two compressors, as described with reference to FIGURE 9 are operated in tandem for each heat pump stage. The hydraulic displacer 17 and 27 of FIGURE 1 for driving the gas displacers 11 and 21 are of similar construction to the compressor of FIGURE 9 except for minor changes consequent upon having hydraulic fluid on both sides of the diaphragm.

Figure 10:
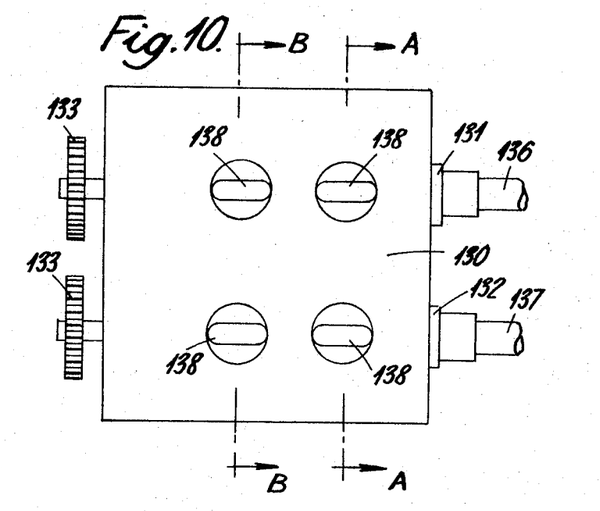
FIGURE 10 is a side elevation of a hydraulic distributor valve assembly used in the apparatus of FIGURE 1.
Figure 11:
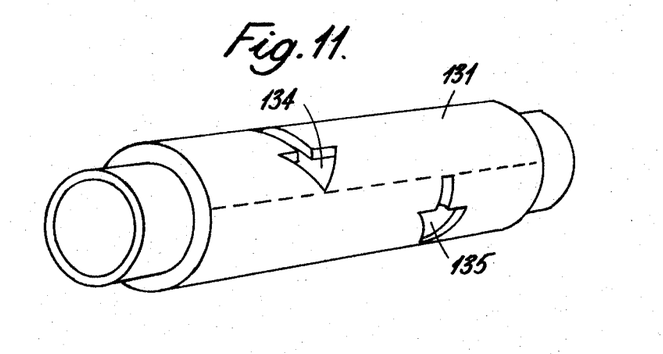
FIGURE 11 is a perspective view of a rotor of the assembly of FIGURE 10.
Figure 12:
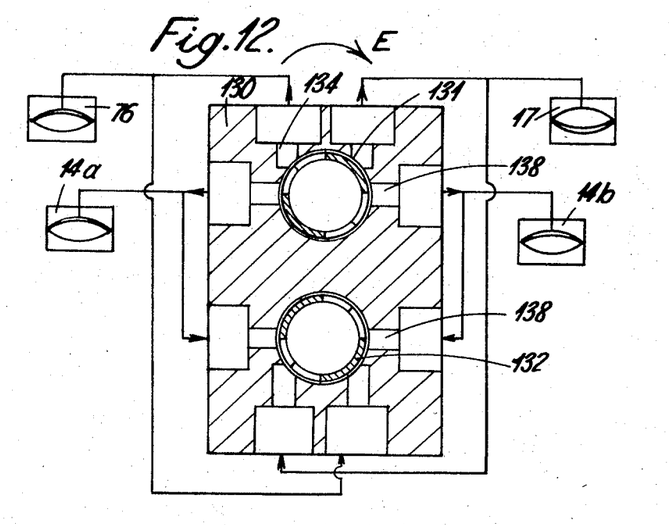
FIGURES 12 and 13 are diagrammatic cross-sections of the valve assembly of FIGURE 10 to explain its operation.
Figure 13:
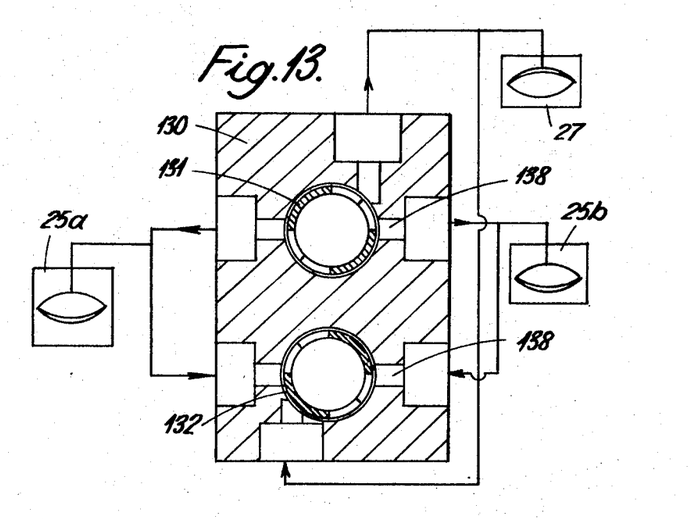

The distributor valve 44 is illustrated in further detail in FIGURES 10 to 13. This valve comprises a housing 130 with two rotors 131 and 132 controlling respectively the application of high pressure fluid to the compressors and displacers and the relief of this fluid at low pressure from the compressors and displacers. The two rotors are driven at the same speed and in the same direction for example by gear wheels 133 meshing with a common pinion not shown. The rotors are similar and one is illustrated in FIGURE 11. Each rotor is hollow and has four ports of which two 134 and 135 are seen. The other two ports are of the same arrow shape as the ports 134 and 135 but located diametrically opposite them. Fluid from the high pressure reservoir 46 is fed in axially at 136 into the rotor 131 whilst the axial outlet from the rotor 132, shown at 137, leads to the low pressure reservoir 47. The ports in the rotor co-operate with outlet ports in the housing. Four of these ports are shown at 138 in FIGURE 10, and their further ports on the other surface of the housing. FIGURES 12 and 13 are sections along A—A and B—B of FIGURE 10 showing all the various ports. The ports shown in FIGURE 12 are for the first stage of the heat pump and the ports in FIGURE 13 are for the second stage. It will be noted that these are relatively displaced so that the two stages operate in opposite phase. Likewise it will be noted that the high pressure and low pressure rotors are displaced by 90 degrees. The direction of rotation of the rotors is indicated by the arrow E in FIGURE 12 and the arrow shaping of the ports in the rotor is such that the point of the arrow is first to meet its associated ports in the housing. This gives a controlled rate of hydraulic fluid flow with time. In FIGURES 12 and 13, the various displacers and compressors are indicated diagrammatically and it will be seen that, by continuous rotation of the two rotors at constant speed, the required cyclic operation of the compressors and displacers is obtained, the ports in the housing being positioned so that they are blocked and unblocked by the rotors at the appropriate times. As previously explained the compressors 14 and 25 operate in two stages and in FIGURE 12, the two stages of compressor 14 are shown at 14a and 14b. In FIGURE 13 the two stages of compressor 25 are shown at 25a and 25b.

We claim:

1. Cryogenic apparatus comprising a heat pump making use of the cyclic compression and expansion of a gas through a regenerator, said heat pump comprising a hydraulically driven free diaphragm compressor coupled to one end of the regenerator and a sealed piston displacer coupled to the other end of the regenerator.

2. Cryogenic apparatus as claimed in claim 1 wherein the hot end of the regenerator is in heat exchange relationship with that end of the displacer towards which the piston travels when the gas is drawn into the displacer and wherein the cold end of the regenerator is in heat exchange relationship with the other end of the displacer.

3. Cryogenic apparatus as claimed in claim 2 and comprising a two stage heat pump, each stage having a hydraulically driven free diaphragm compressor, a sealed piston displacer, and a regenerator, the cold ends of the first stage displacer and regenerator being in heat exchange relationship with an intermediate point in the second stage regenerator.

4. Cryogenic apparatus as claimed in claim 3 wherein the second stage displacer has a longer cylinder than the first stage displacer, the end of the second stage displacer towards which the piston travels when the gas is drawn into the displacer is in heat exchange relationship with the hot ends of both regenerators.

5. Cryogenic apparatus as claimed in claim 4 wherein there is provided for a plate acting as a heat exchanger for the hot ends of the two displacers and two regenerators and means for water cooling said plate.

6. Cryogenic apparatus as claimed in claim 3 and operating with helium, wherein there is provided a source of compressed helium, and wherein the two stage heat pump is arranged to effect cooling of said compressed helium to below the Joule-Thomson inversion temperature and wherein a Joule-Thomson expansion stage is provided fed with compressed helium cooled by the two stage heat pump.

7. Cryogenic apparatus as claimed in claim 1 wherein the compressor and displacer are operated in a modified Kirk cycle comprising firstly, with the gas in the compressor and regenerator, effecting compression, secondly forcing gas at constant pressure out of the compressor through the regenerator into the displacer, thirdly expanding the gas into the displacer, fourthly reducing the pressure by expanding gas back into the compressor to restore the initial volume therein and fifthly reducing the volume in the displacer to zero.

8. Cryogenic apparatus as claimed in claim 7 and having a two stage heat pump wherein the two stages are each operated in said modified Kirk cycle with cycles in opposite phase.

9. Cryogenic apparatus as claimed in claim 1 wherein the compressor and displacer are hydraulically operated, a rotary valve being provided giving cyclically controlled flow rates to apply the hydraulic fluid applied sequence to drive the compressor and displacer.

10. Cryogenic apparatus as claimed in claim 1 wherein the compressor comprises a hollow body with a flexible fluid-tight diaphragm extending across it, the body, on the gas side of the diaphragm, having a plurality of gas inlet/outlet passages.

11. Cryogenic apparatus as claimed in claim 1 wherein the displacer comprises a piston operating in a cylinder, the piston being sealed by a rolling diaphragm seal.

12. Cryogenic apparatus as claimed in claim 11 wherein the displacer is hydraulically operated and wherein a free diaphragm compressor is provided for applying hydraulic fluid to the displacer.

13. Cryogenic apparatus as claimed in claim 11 wherein the displacer is attached to a first rolling diaphragm seal and wherein a second rolling diaphragm seal, inverted with respect to the first, is provided between the hydraulic operating fluid and the first rolling diaphragm seal, the space between the two seals being filled with hydraulic fluid.

14. Cryogenic apparatus as claimed in claim 11 wherein the displacer is attached to a first rolling diaphragm seal and wherein a second seal is provided between the hydraulic operating fluid and the first rolling diaphragm seal, the space between the two seals being filled with hydraulic fluid, and wherein sensing means are provided responsive to the gas pressure in the displacer which sensing means control the pressure of said fluid in the space between the two seals to maintain it at a pressure below that gas pressure.

15. Cryogenic apparatus as claimed in claim 1 wherein means are provided for sensing the mean gas pressure in the heat pump over a time period long compared with the time of a cycle of operation and wherein means are provided, in response to the sensed gas pressure, for passing gas into or out of the heat pump to maintain the operating pressure during cooling and to remove excess gas on termination of cooling operation.

16. Cryogenic apparatus as claimed in claim 3 wherein means are provided for sensing the mean gas pressure in each stage of the heat pump over a time period long compared with the time of a cycle of operation, said means being arranged, in response to the sensed gas pressure, to pass gas into or out of the associated stage of the heat pump to maintain the operating pressure during cooling and to remove excess gas on termination of cooling operation.

17. Cryogenic apparatus comprising a two stage heat pump, each stage comprising a compressor, displacer and regenerator operating on modified Kirk cycles consisting of firstly effecting compression with the gas in the compressor, secondly forcing gas at constant pressure out of the compressor through the regenerator into the displacer, thirdly expanding the gas into the displacer, fourthly reducing the pressure by expanding the gas back into the compressor to restore the initial volume therein and fifthly reducing the volume in the displacer to zero.

18. Cryogenic apparatus as claimed in claim 17 and having first, second and third heat exchangers, the first stage of the heat pump being arranged to operate between the first and second heat exchangers to maintain the second heat exchanger at a lower temperature than the first, and the second stage of the heat pump being arranged to operate between the first and third stage heat exchangers to maintain the third heat exchanger at a lower temperature than the first, and the second heat exchanger being thermally connected to an intermediate point between the ends of the regenerator for the second stage.

19. Cryogenic apparatus as claimed in claim 18 wherein the compressors and displacers are sealed and are hydraulically operated with helium as a working gas.

20. Cryogenic apparatus as claimed in claim 18 wherein means are provided for water-cooling the first heat exchanger.

References Cited

UNITED STATES PATENTS

| | | | |
|---|---|---|---|
| 3,091,092 | 5/1963 | Dros | 62—6 |
| 3,119,237 | 1/1964 | Gifford | 62—6 |
| 3,188,821 | 6/1965 | Chellis | 62—6 |
| 3,205,668 | 9/1965 | Gifford | 62—6 |
| 3,312,072 | 4/1967 | Gifford | 62—6 |
| 3,321,926 | 5/1967 | Chellis | 62—6 |

WILLIAM J. WYE, *Primary Examiner.*